United States Patent [19]

Janczak et al.

[11] Patent Number: 5,070,266
[45] Date of Patent: Dec. 3, 1991

[54] ELECTROMECHANICAL DEVICE FOR STOPPING A SHAFT IN AT LEAST ONE POSITION

[75] Inventors: Christian Janczak, Schriesheim; Richard Schopp, Heidelberg, both of Fed. Rep. of Germany

[73] Assignee: Teldix GmbH, Heidelberg, Fed. Rep. of Germany

[21] Appl. No.: 466,328

[22] PCT Filed: Oct. 28, 1988

[86] PCT No.: PCT/EP88/00973
§ 371 Date: May 7, 1990
§ 102(e) Date: May 7, 1990

[87] PCT Pub. No.: WO89/04431
PCT Pub. Date: May 18, 1989

[30] Foreign Application Priority Data

Nov. 6, 1987 [DE] Fed. Rep. of Germany ....... 3737686

[51] Int. Cl.$^5$ .................... H02K 17/102; B60K 41/08
[52] U.S. Cl. ..................................... 310/77; 192/1.38
[58] Field of Search .................... 188/31, 61, 69, 161, 188/171, 173; 192/1.38; 310/29, 32, 37, 77, 78

[56] References Cited

U.S. PATENT DOCUMENTS

| | | | |
|---|---|---|---|
| 3,022,432 | 2/1962 | Timmer et al. | 310/37 |
| 4,022,069 | 5/1977 | Boyer | 74/126 |
| 4,071,121 | 1/1978 | Daniel | 188/171 |
| 4,515,251 | 5/1985 | Wruk | 188/171 |
| 4,746,826 | 5/1988 | Burney | 310/78 |
| 4,750,375 | 6/1988 | Godesa | 188/82.3 |

FOREIGN PATENT DOCUMENTS

| | | |
|---|---|---|
| 2601558 | 7/1977 | Fed. Rep. of Germany. |
| 2927368 | 1/1981 | Fed. Rep. of Germany. |
| 3603461 | 8/1987 | Fed. Rep. of Germany. |
| 2588702 | 4/1987 | France. |

*Primary Examiner*—Steven L. Stephan
*Assistant Examiner*—D. L. Rebsch
*Attorney, Agent, or Firm*—Spencer & Frank

[57] ABSTRACT

In a stopping device for a shaft, which acts in all three dimensions and is unaffected by large accelerations, a gear on the shaft of an engine is stopped by a locking pawl which engages the gear when the electromagnet is not excited. A magnetic field generated by the passage of current through a coil produces a torque which turns the rotating armature against the force of a spring in such a way that the locking pawl is moved radially outward around the gear and over a guide pin on the rotating armature which can be moved in a guide slot of the locking pawl, and thereby releases the gear and hence the shaft.

4 Claims, 1 Drawing Sheet

SECTION A-B

ELECTROMECHANICAL DEVICE FOR STOPPING A SHAFT IN AT LEAST ONE POSITION

BACKGROUND OF THE INVENTION

The invention relates to an electromechanical device for stopping a shaft in at least one position.

There is a demand for many motor drives to have the drive remain in the position it is in at the time it is turned off or for a precisely defined starting position to be maintained prior to removal of a brake from the drive and activation of the motor drive.

DE-OS 2,601,558 discloses an electromechanical brake device for electric motors, in particular, for lower performance motors, on whose shaft, preferably on a second free shaft end, is disposed a brake cam disk, which is not rotatable, or rotates against resistance in circumferential direction, having one or a plurality of cams which, when the motor is turned off from the supply current, are engaged by a blocking element operating, for example, by the resilience of a spring. The blocking element is part of a special electromagnet, which at the start of the motor is also connected to the current and thus magnetically disengages the blocking element again from its engagement with the cam(s) of the brake cam disk.

SUMMARY OF THE INVENTION

It is the object of the invention to produce an electromechanical device for stopping a shaft in which the function of stopping, independent of the great accelerations in all three space axes is effective. The electrical energy required for unlocking should be as low as possible.

The solution is found by means of an electromechanical device according to the invention for stopping a shaft in at least one position having an electromagnet, a locking pawl operable by means of the electromagnet, a component connected with the shaft which the locking pawl engages in its stop position and a spring which counteracts the force exerted on the locking pawl by the excited electromagnet. The electromechanical device is characterized by the component being a toothed wheel connected to the shaft and the locking pawl being provided with corresponding toothing for engaging the toothed wheel. There is a coil of the electromagnet arranged coaxial to the shaft axis, the coil being housed in a housing of permeable material having an E-shaped cross section, and at a central portion of the housing a rotational armature of permeable material is disposed which has at least one pole shoe. At an interior face of a housing wall at least one pole shoe of permeable material is arranged on a plane with the rotational armature, with the pole shoes being arranged in such a way that their radial ends face one another while forming a small radial air gap. Between the rotational armature and the locking pawl there is a connection comprising a guide pin and a delimited guide slot, the connection being arranged in such a way that during a rotational movement of the rotational armature the locking pawl is moved radially and as a result, the locking pawl is brought out of or into its stopping position in accordance with the direction of the rotational movement and that the rotational movement of the rotational armature is delimited in such a way that an unexcited electromagnet causes the frontal faces of the pole shoes to overlap only slightly while an excited electromagnet causes them to overlap to a greater degree, although not completely.

Advantageous embodiments are set forth in the dependent claims.

The invention is further explained below by way of an embodiment.

BRIEF DESCRIPTION OF THE DRAWINGS

It is shown in.

DESCRIPTION OF THE PREFERRED EMBODIMENTS

Figure 1:
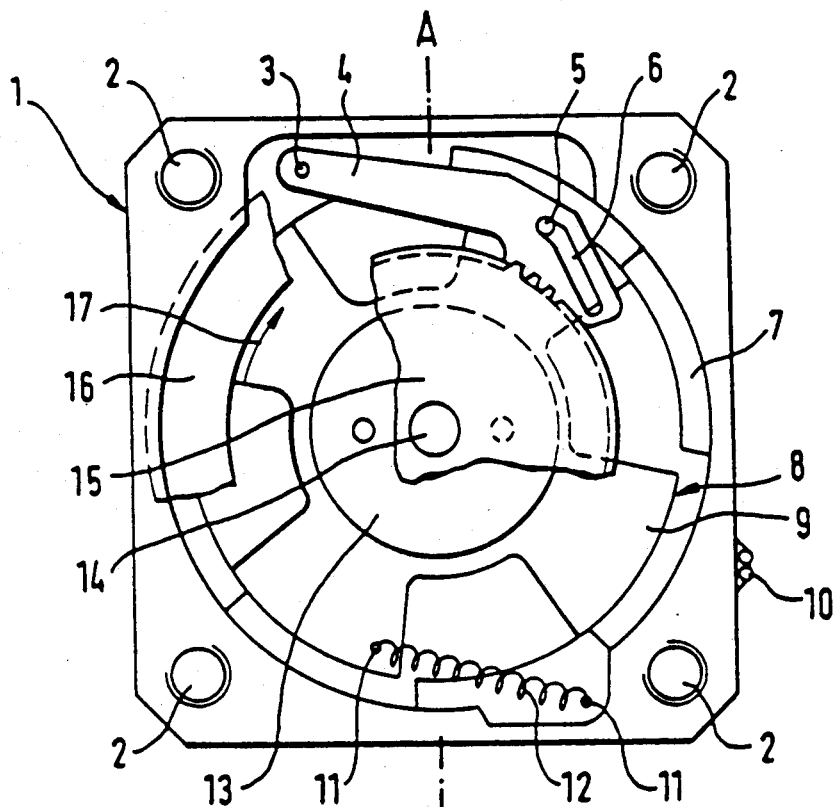
FIG. 1, a top view of the stop device according to the invention.

The housing 1 of the stop device in FIG. 1 comprises soft iron and has the shape of a square. A threaded bore 2 is disposed in each of the four bevelled corners of the housing 1 for fastening the stop device to a motor unit (not shown).

For connecting the stop device to a control device, connecting wires 10 from coil 18 of the electromagnet extend through one surface of the housing.

On the interior surface of the housing 1 four pole shoes 7, which form one unit with the housing, set off at 90° relative to one another with an intermediate space of approximately 45°. The housing wall has two counterbores opposite one another on two places on the upper face.

One of these counterbores serves to receive the journal 3 of the locking pawl 4 on which the locking pawl pivots radially toward the exterior if the electromagnet is excited and to receive the locking pawl during the excited state of the electromagnet. The other counterbore comprises the first portion of the spring suspension 11 of the spring 12. On the interior of the housing 1 the annular coil 18 of the electromagnet is glued in such a manner that the rotating armature 8 forms a slight axial air gap toward the coil, with the side facing the coil 18 and the frontal faces of the pole shoes 9 of the rotating armature 8 facing the pole shoes 7 of the housing 1 on one plane leaving a slight radial air gap.

The rotating armature 8 of soft iron, which is attached to the housing 1 of the stop device by means of the center screw 13 and which is disposed on a teflon ring 19, also has four approximately 45° wide pole shoes 9 arranged around its circumference and offset in relation to one another by 90°. The frontal faces of said pole shoes 9 cover the housing 1 only minimally during the unexcited state of the electromagnet while forming a slight radial air gap. Disposed on one pole shoe 9 of the rotating armature 8 opposite the journal 3 of the locking pawl, is the second portion of the spring suspension 11 of the spring 12. Opposite the pole shoe 9, set off from the second portion of the spring suspension 11 by about 180°, the movable guide pin 5 is attached to a pole shoe 6 of the rotating armature 8, which is fastened to a guide slot 6 of the locking pawl 4, together with the guide pin 5 that may be moved with the rotating armature 8.

On the side facing the shaft axis 20 the locking pawl 4 has four teeth, which in the unexcited state of the electromagnet engage the toothed wheel 15, shown in FIG. 1 only in part, on the shaft 14 connected with the motor drive (not shown).

On the side facing away from the spool 18 is the supporting ring 16 (here only shown in part), whose purpose is the axial movement of the locking pawl 4 onto the journal 5 and to prevent the spring 12 from slipping off away from the spring suspensions 11.

In the unexcited state of the electromagnet the rotating armature 8 is rotated counter clockwise about the shaft axis 20 by means of the spring 12 until the guide pin 5 connects with the left side of the guide slot 6 of the locking pawl 4. In this position the teeth of the locking pawl 4 engage the teeth of the toothed wheel 15 and stop the movement of the shaft 14.

If the connecting wires 10 are attached to a direct current, the coil 18 creates a magnetic field which generates a torque which is directed in such a way that a movement of the rotational armature results, reducing the magnetic resistance of the magnetic circuit (comprising the coil 18, housing 1, pole shoe 7, pole shoe 9, rotational armature 8 air gap between pole shoes 7 and 9), which causes the rotational armature 8 to be rotated clockwise 17 against the spring force of the spring 12 until the guide pin 5 connects at the right side of the guide slot 6 of the locking pawl. The frontal faces of the pole shoes 7 and 9 of the housing 1 and rotational armature 8 overlap by approximately 50% in the excited state of the electromagnet while forming a slight radial air gap.

Consequently, the electromagnet, whose magnetic field constantly attempts to reduce the magnetic resistance even further, effects a sufficient clockwise 17 torque on the rotational armature 8, with the result of preventing the stopping of the shaft 14 by means of the locking pawl 4.

Figure 2:
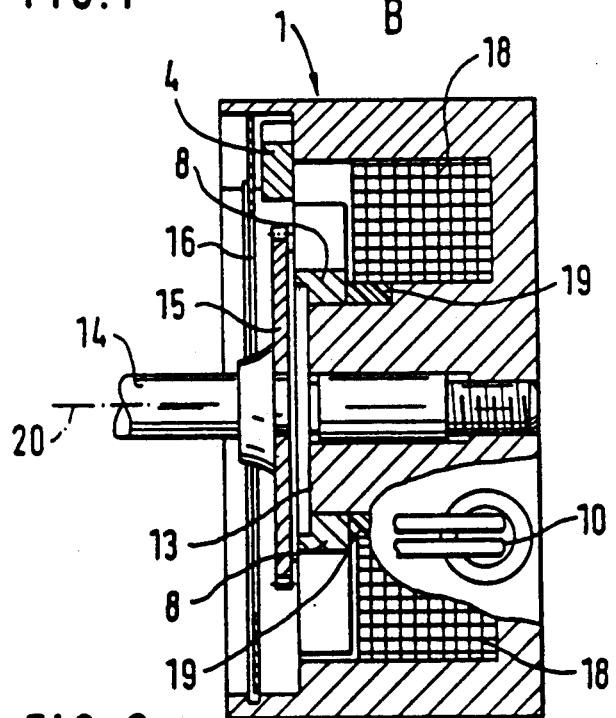
FIG. 2, a side view of the stop device according to the invention as a section of the A - B plane in FIG. 1.

FIG. 2 shows a side view of a section of the stopping device according to the invention on the A - B plane shown in FIG. 1. This Figure shows that the coil 18 is arranged about the central yoke of the E-shaped housing 1. The central yoke is stepped on the side facing the rotational armature 8 and receives the teflon ring 19 on this step region. The teflon ring 19 projects slightly from the radial surface of the coil 18 in order to prevent contact between the two parts by means of an axial distance of the rotational armature 8 from the coil 18. The toothed wheel 15 is arranged on the shaft 14 of the motor (not shown) in such a way that the frontal faces of the toothed wheel 15 and of the locking pawl 4 are facing each other during the excited state of the electromagnet while forming a small axial air gap toward the rotational armature 8 and toward the center screw 13.

We claim:

1. Electromechanical device for stopping a shaft in at least one position, comprising an electromagnet, a locking pawl operable by means of the electromagnet, a component connected with the shaft which the locking pawl engages in its stop position and a spring which counteracts the force exerted on the locking pawl by the excited electromagnet, characterized in that the component is a toothed wheel connected to the shaft and the locking pawl is provided with corresponding toothing for engaging the toothed wheel, that a coil of the electromagnet is arranged coaxial to the shaft axis, that the coil is housed in a housing of permeable material having an E-shaped cross section, that at a central portion of the housing a rotational armature of permeable material is disposed which has at least one pole shoe, that at an interior face of a housing wall at least one pole shoe of permeable material is arranged on a plane with the rotational armature, with the pole shoes being arranged in such a way that their radial ends face one another while forming a small radial air gap, that between the rotational armature and the locking pawl there is a connection comprising a guide pin and a delimited guide slot, said connection being arranged in such a way that during a rotational movement of the rotational armature the locking pawl is moved radially and as a result, the locking pawl is brought out of or into its stopping position in accordance with the direction of the rotational movement and that the rotational movement of the rotational armature is delimited in such a way that an unexcited electromagnet causes the frontal faces of the pole shoes to overlap only slightly while an excited electromagnet causes them to overlap to a greater degree, although not completely.

2. Electromechanical device according to claim 1, characterized by a spring interposed between the housing and the rotational armature.

3. Electromechanical device according to claim 1, characterized in that the shaft is a driven shaft.

4. Electromechanical device according to claim 1, characterized in that the axial movement of the spring and the locking pawl is delimited by means of a supporting ring.

* * * * *